Jan. 2, 1968     S. QUISLING     3,360,923
TELESCOPING CHAINS
Filed Dec. 9, 1965     2 Sheets-Sheet 1
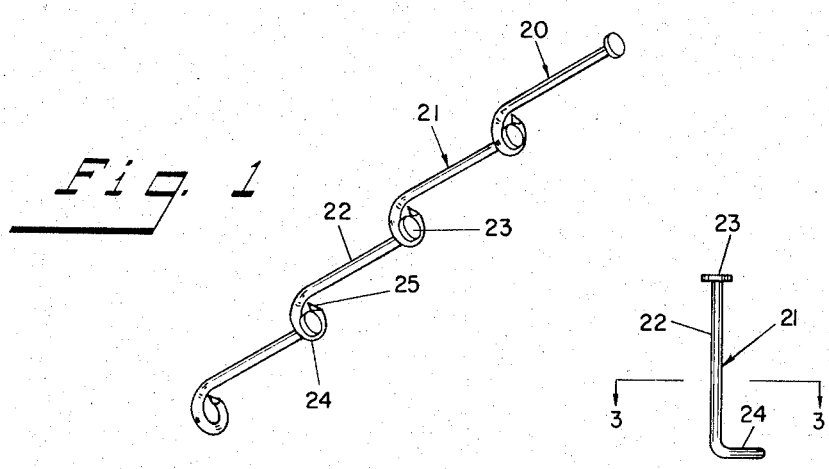
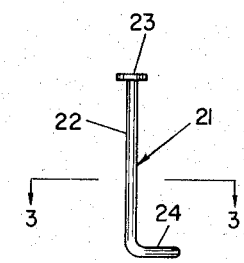
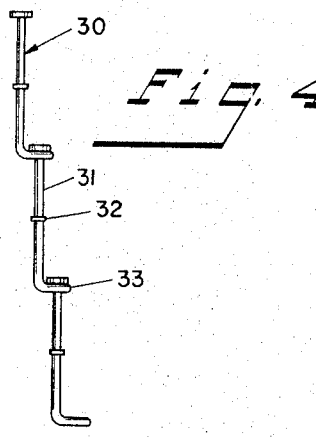
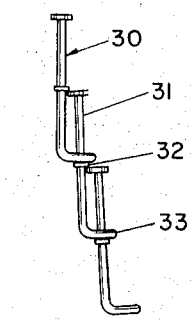
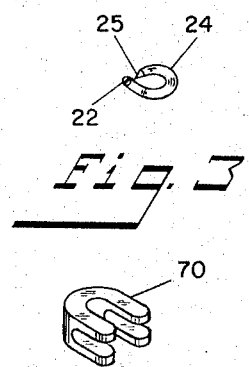
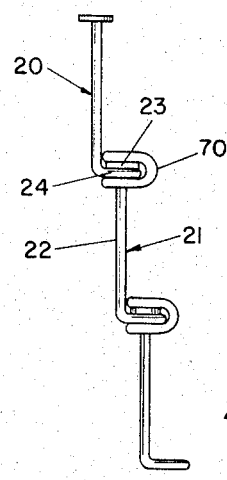
INVENTOR
BY SVERRE QUISLING Jan. 2, 1968 S. QUISLING 3,360,923
TELESCOPING CHAINS
Filed Dec. 9, 1965 2 Sheets-Sheet 2
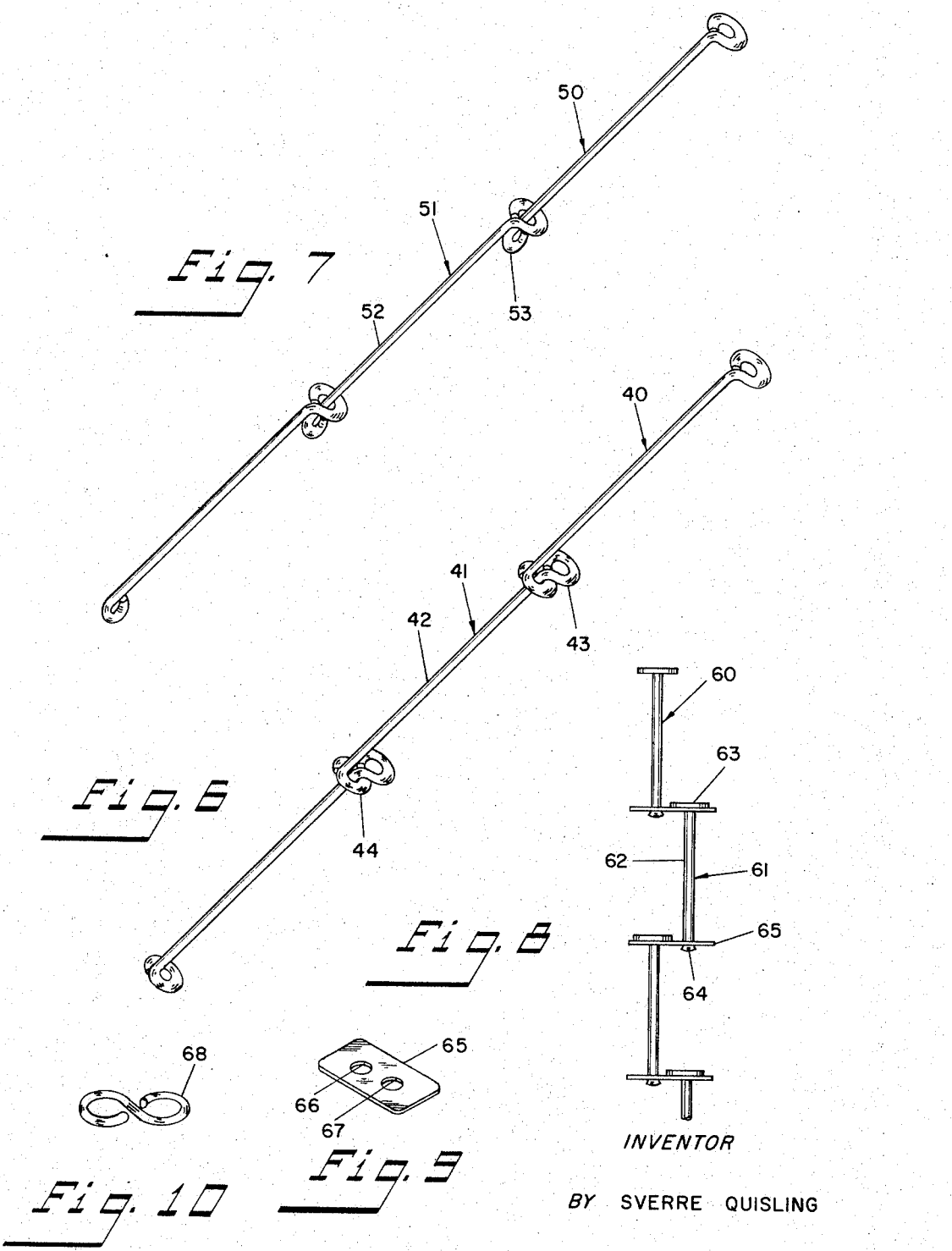
INVENTOR
BY SVERRE QUISLING United States Patent Office 3,360,923
Patented Jan. 2, 1968

1

3,360,923
TELESCOPING CHAINS
Sverre Quisling, 1240 Sherman Ave.,
Madison, Wis. 53704
Filed Dec. 9, 1965, Ser. No. 512,624
6 Claims. (Cl. 59—78)

ABSTRACT OF THE DISCLOSURE

A chain having elongate links interlocked in telescoping relation. In one form, the links are made of standard penny nails each having their pointed end bent into a loop about the shaft of another nail. The head end and the loop end of interconnected links may be held in fixed relation by U-shaped retaining clips. The links may be made of rods having identical transversely disposed looped ends. The substantially straight shafts of adjacent links may be slidably received in transversely extending multi-hole rigid connecting members.

---

This invention relates to chains and more particularly to novel collapsible chains comprising elongated links having interlocked ends.

An object of my invention is to provide a new lightweight chain made up of elongated links interlocked in telescoping relation for convenient storage and use.

Another object of my invention is to provide a telescoping chain having links formed from interlocked nails.

Still another object of my invention is to provide a telescoping chain having elongated links which may be held in substantially fixed relation with respect to one another.

Further objects, features and advantages of my invention will be apparent from the following detailed description take in conjunction with the accompanying drawings wherein several embodiments of my invention have been selected for exemplification.

In the drawings:

FIG. 1 is a perspective view of one form of chain embodying my invention.

FIG. 2 is a side view of one link of the chain of FIG. 1.

FIG. 3 is a sectional view taken along line 3—3 of FIG. 2 showing the loop end of the link in plan.

FIG. 4 is a side view of a second embodiment of a chain in its extended position.

FIG. 5 is a side view of the chain of FIG. 4 in its collapsed condition.

FIG. 6 is a perspective view of a third form of chain embodying my invention.

FIG. 7 is a perspective view of a fourth form of my chain embodying my invention.

FIG. 8 is a side view of a fifth form of chain embodying my invention.

FIG. 9 is a perspective view of one of the connecting plates of the chain of FIG. 8.

FIG. 10 is a plan view of a second form of connecting member which may be used in connection with my chain.

FIG. 11 is a perspective view of a clip for holding two links of my chain in substantially fixed relation.

FIG. 12 is a top view of the clip of FIG. 11.

FIG. 13 is a side view of the clip of FIG. 11.

FIG. 14 is a side view of the chain of FIG. 1 wherein the links thereof are held in substantially fixed relation by a plurality of clips such as shown in FIG. 11.

Referring now more particularly to the drawings wherein like numerals refer to like parts throughout the several views, one form of my chain is generally shown at 20 in FIG. 1. Chain 20 comprises a plurality of links 21 interconnected together in telescopic relation. As shown in

2

FIG. 1, in chain 20 the links 21 may be preferably formed from standard penny nails, thus, the chain can be made very inexpensively from a readily available commodity.

Each link 21 has an elongated shaft portion 22 connecting a head end 23 and a loop end 24. As best seen in FIGS. 2 and 3 the loop end 24 is substantially transverse to the length of the shaft portion 22. As shown in FIGS. 2 and 3 by way of exemplification, the loop ends 24 lie in a plane forming substantially a right angle with shaft portion 22. The loop end 24 of each link 21 is bent so as to encircle the shaft portion 22 of the next link adjacent the head portion thereof.

As best seen in FIG. 1 and FIG. 3, the loop end 24 is of such a size that the shaft portion 22 of the link it encircles can slide freely therethrough, but the head end 23 of the link cannot pass therethrough. The end 25 of the loop end 24 need not be attached to the shaft portion 21; however, if more strength is desired the ends 25 of the loop ends 24 may be fused to the shaft portions 22 by a spot weld.

Referring now to FIGS. 4 and 5, there is shown at 30 a second embodiment of my invention. This embodiment 30 is identical to chain 20 except that the shaft portion 31 thereof has an enlargement 32 thereon which is of such a size that it will not pass through the loop end 33 of the chain 30. FIG. 5 shows chain 30 in its telescoped or collapsed condition wherein the enlargements 32 engage the loop ends 33 to prevent the chain from being totally collapsed.

FIG. 6 shows a third form 40 of my chain which can be quickly and inexpensively made from segments of substantially rigid metal wire or the like. Each of the links 41 comprise an elongated shaft portion 42 connecting a head end 43 and a loop end 44. The ends 43 and 44 are substantially transverse to the shaft portion 42 and as shown in the drawings they lie in planes which form substantially right angles with the connecting shaft portion 42. As shown in the drawings head ends 43 and loop ends 44 of links 41 are substantially identical so that they may be formed by the same wire bending machine operation.

The chain 50 shown in FIG. 7 is substantially the same as chain 40, except that the head ends 53 of the links 51 lie in a plane which is substantially parallel to the shaft portions 52.

FIG. 8 shows a fifth form 60 of my invention comprising a plurality of links 61 which may be formed from standard penney nails or from substantially rigid metal wire. In the form of chain shown at 60 in FIG. 8, the links 61 are made from nails and have an elongated shaft portion 62 connecting a head end 63 and a blunted tail end 64. The link 61 are fastened together in telescoping relation by connecting member 65. As shown in FIGS. 8 and 9, one form of the connecting member 65 may be a substantially rigid metal plate having holes 66 and 67 therethrough. The holes 66 and 67 are of such a size that they slideably receive shaft portions 62 but will not permit head ends 63 or the blunted tail ends 64 of the links 61 to pass therethrough.

Another embodiment of a connecting member is shown at 68 in FIG. 10 in the form of an S-shaped wire hook.

FIGS. 11–13 show a clip 70 which may be fastened on the respective head ends 23 and loop ends 24 of adjacent links in chain 20 for temporarily holding the links 21 in substantially fixed relation. This allows the chain 20 to be made temporarily substantially rigid. Among various other uses, this will permit the chain to be pushed through tubular conduits which for some reason may be accessible only from one end.

The U-shaped clip 70 shown is particularly adapted for use with chains such as 20 and 30. It is of course understood that various other configurations of clip 70 may be employed for use in connection with chains such as 40 and 50 without departing from my invention.

It is understood that my invention is not confined to the particular construction and arrangement of parts herein illustrated and described, but embraces all such modified forms thereof as come within the scope of the following claims.

I claim:
1. A chain comprising:
  (a) a plurality of links interconnected in telescoping relation,
  (b) each of said links having an elongated shaft portion connecting a head end and tail end,
  (c) a substantially flat member having at least a pair of transversely spaced holes extending therethrough connecting the head ends of said links with the tail ends of adjacent links, and
  (d) the head ends and tail ends of said links being of such a size that said links are retained in said flat member substantially transverse thereto.
2. A chain comprising:
  (a) a plurality of standard penny nails interconnected in telescoping relation,
  (b) each of said nails having a shaft portion connecting a head portion and a pointed end,
  (c) said pointed end of each of said nails being bent into a transverse loop,
  (d) said loop encircling the shaft portion of another nail adjacent the head portion thereof, and
  (e) said loop being of such a size that the head portion of the other nail will not pass therethrough.
3. A chain comprising:
  (a) a plurality of elongate links interconnected in telescoping relation,
  (b) each of said links having a shaft portion connecting a head end and a loop end, said ends being identical,
  (c) said loop end encircling the shaft portion of another link adjacent the head end thereof, and
  (d) said loop end being of such a size that the head end of the other link will not pass therethrough.
4. A chain comprising:
  (a) a plurality of elongate links interconnected in telescoping relation,
  (b) each of said links having a shaft portion connecting a head end and a loop end,
  (c) said loop end encircling the shaft portion of another link adjacent the head end thereof,
  (d) said loop end being of such a size that the head end of the other link will not pass therethrough,
  (e) the head end of each of said links comprising a loop lying in a plane substantially parallel to its connecting shaft portion, and
  (f) the loop end of each of said links comprising a loop lying in a plane substantially transverse to its connecting shaft portion.
5. A chain comprising:
  (a) a plurality of elongate links interconnected in telescoping relation,
  (b) each of said links having a shaft portion connecting a head end and a loop end,
  (c) said lop end encircling the shaft portion of another link adjacent the head end thereof,
  (d) said lop end being of such a size that the head end of the other link will not pass therethrough, and
  (e) means for releasably securing the links of said chain in substantially fixed extended relation.
6. The chain as specified in claim 5 wherein said means comprises a generally U-shaped rigid metal clip.

References Cited

UNITED STATES PATENTS

| | | | |
|---|---|---|---|
| 145,642 | 12/1873 | Frontier | 59—82 |
| 1,238,847 | 9/1917 | Vanderveld | 59—78 |
| 2,072,898 | 3/1937 | Martin | 287—103 |
| 2,087,479 | 7/1937 | Quisling | 59—78 |

CHARLES W. LANHAM, *Primary Examiner.*

G. P. CROSBY, *Assistant Examiner.*